US007611636B2

(12) United States Patent
Matsuura et al.

(10) Patent No.: US 7,611,636 B2
(45) Date of Patent: Nov. 3, 2009

(54) ULTRASONIC SOLUTION SEPARATING METHOD AND ULTRASONIC SEPARATING APPARATUS USED IN SUCH METHOD

(75) Inventors: Kazuo Matsuura, Naruto (JP); Toshiaki Miyamoto, Toyohachi (JP)

(73) Assignee: Ultrasound Brewery, Naruto-shi (JP)

( * ) Notice: Subject to any disclaimer, the term of this patent is extended or adjusted under 35 U.S.C. 154(b) by 112 days.

(21) Appl. No.: 11/794,314

(22) PCT Filed: Dec. 27, 2005

(86) PCT No.: PCT/JP2005/023978

§ 371 (c)(1),
(2), (4) Date: Jun. 27, 2007

(87) PCT Pub. No.: WO2006/070839

PCT Pub. Date: Jul. 6, 2006

(65) Prior Publication Data

US 2008/0000842 A1 Jan. 3, 2008

(30) Foreign Application Priority Data

Dec. 28, 2004 (JP) ............................ 2004-381996

(51) Int. Cl.
*B01D 17/00* (2006.01)

(52) U.S. Cl. .................................... 210/748; 210/198.1

(58) Field of Classification Search ................. 210/151; 431/10; 95/21, 29, 30; 239/8, 1, 10, 34, 239/102.1; 96/389, 175, 219, 6
See application file for complete search history.

(56) References Cited

U.S. PATENT DOCUMENTS 5,127,822 A * 7/1992 Nakayama et al. ............ 431/10
5,170,697 A * 12/1992 Kuboyama ................... 99/470

FOREIGN PATENT DOCUMENTS

| | | | |
|---|---|---|---|
| JP | 52-136407 | A | 11/1977 |
| JP | 54-8706 | U | 1/1979 |
| JP | 57-42367 | A | 3/1982 |
| JP | 7-185203 | A | 7/1995 |
| JP | 2001-314724 | A | 11/2001 |
| JP | 2003-311102 | A | 11/2003 |

* cited by examiner

*Primary Examiner*—Walter D Griffin
*Assistant Examiner*—Cameron J Allen
(74) *Attorney, Agent, or Firm*—Birch, Stewart, Kolasch & Birch, LLP

(57) ABSTRACT

An ultrasonic solution separating method and apparatus separates a solution by ultrasonically vibrating the solution by using an ultrasonic vibrator to atomize the solution into mists, and such atomized mists are condensed and collected for separation from the solution. In the present method and apparatus, a tube 6, defining a spray opening 12 at an upper end of the tube, is filled with the solution; an ultrasonic vibration is applied to the solution inside the tube 6, toward the spray opening 12; the atomized mists are dispersed from the spray opening 12; and a carrier gas is supplied to the mists dispersed from the spray opening 12 so that the mists are atomized in the carrier gas.

13 Claims, 9 Drawing Sheets

ULTRASONIC SOLUTION SEPARATING METHOD AND ULTRASONIC SEPARATING APPARATUS USED IN SUCH METHOD

TECHNICAL FIELD

This invention relates to a method and apparatus for separating a highly concentrated solution having a high concentration of a specific substance from a mixture containing two or more substances, or for separating a target substance contained in a solution, and particularly pertains to a method and apparatus for separating alcohol of an even higher concentration from an alcohol solution such as Sake and a Sake raw material, or a separating method and apparatus ideal for separating a target substance from gasoline.

BACKGROUND ART

The present inventors have earlier developed an apparatus for separating highly concentrated alcohol from alcohol (See Patent Document 1).

Patent Document 1: Japanese Laid-Open Patent Publication No. 2001-314724

In this particular separating apparatus, an alcohol solution is filled in an ultrasonic atomization chamber of a closed structure, the alcohol solution in the ultrasonic atomization chamber is ultrasonically vibrated by an ultrasonic vibrator to be atomized into mists, and the atomized mists are condensed and collected to separate a highly concentrated alcohol solution. This separating apparatus is able to separate highly concentrated alcohol in the following mechanism.

When compared with water, alcohol is easier to migrate to the surface portion of a solution, and the solution has a higher concentration of alcohol at the surface portion. In such a state, when the solution is ultrasonically vibrated, the highly concentrated alcohol turns into mists of fine particles and is released into the air under the effect of energy generated by the ultrasonic vibration. The mists released into the air have a high concentration of alcohol. This is because the solution at the surface, where the alcohol concentration is high, is easier to turn into mists. Consequently, when the mists are condensed and collected, a highly concentrated alcohol solution is obtained. This method enables a highly concentrated alcohol solution to be separated without heating the solution. Thus, it becomes possible to separate a target substance for a higher concentration with lower energy consumption. And, in absence of exposure to heat, this method carries the advantage that a target substance can be separated without being deteriorated.

DISCLOSURE OF THE INVENTION

In this kind of apparatus, efficient creation of mists by ultrasonic vibration is vital. And, in order to increase the amount of solution turned to mists per unit time, a lot of ultrasonic vibrators 102 are used, as shown in FIG. 1. In this apparatus, however, it is not possible for all of the ultrasonic vibrators 102 to atomize a solution into mists efficiently at the same time. This is because the efficiency of atomizing the solution into mists by the ultrasonic vibration is related to a mist concentration in a gas. When the mist concentration in the gas becomes high, the efficiency of the solution being turned into mists decreases to a remarkable extent. Because of this, in FIG. 1, the amount of solution being turned into mists by the ultrasonic vibrators 102 on the downstream side is dramatically lowered to a fraction of the amount of solution being turned into mists by the ultrasonic vibrators 102 on the upstream side. This is because highly concentrated mists are contained in the gas on the downstream side. Consequently, it becomes problematic that even when a lot of ultrasonic vibrators are provided, an amount of solution corresponding to the vibrator number cannot be atomized into mists. This shortcoming could certainly be reduced when the mist concentration in the gas is lowered by supplying a greater amount of air. However, when a greater amount of air is supplied, the atomized mists have to be condensed from such amount of air, resulting in a reduced efficient of recovery. It is, therefore, very important to efficiently atomize the solution into mists with a reduced amount of air.

A first object of the invention is to achieve such a goal, that is, to provide an ultrasonic solution separation method and apparatus for atomizing a solution into mists efficiently by a plurality of ultrasonic vibrators, with a reduced amount of carrier gas.

Also, it is a second object of the invention to provide an ultrasonic solution separating method and apparatus in which an ultrasonic vibrator itself is able to atomize the solution into mists efficiently.

The inventors have made every effort for achieving such objects, and have been able to accomplish the present invention.

In the ultrasonic solution separating method provided by the invention, a solution is atomized into mists by being ultrasonically vibrated with a plurality of ultrasonic vibrators, and such atomized mists are condensed and collected for separation from the solution. The ultrasonic separating method includes the steps of filling the solution in a tube 6 defining a spray opening 12 at the upper end, applying an ultrasonic vibration to the solution in the tube 6, toward the spray opening 12, atomizing the solution into mists, and supplying a carrier gas to the mists released from the spray opening 12 so that the mists are dispersed and atomized in the carrier gas.

In the ultrasonic solution separating method according to the invention, the tube 6 can be a cylindrical tube, or a conical horn that is tapered toward the spray opening 12, or alternatively an exponential horn can be used as well.

Also, in the ultrasonic solution separating method according to the invention, a carrier gas can be blown around the spray opening 12. The carrier gas to be blown around the spray opening 12 can be selected from an inert carrier gas such as nitrogen, helium and argon.

The ultrasonic solution separating apparatus according to the invention includes: a plurality of ultrasonic vibrators 2 for ultrasonically vibrating the solution to atomize the solution into mists; a plurality of ultrasonic power sources 3, connected to the ultrasonic vibrators 2, for supplying a high-frequency power to the ultrasonic vibrators 2 for ultrasonic vibration; and a collection unit 5 for condensing and collecting the mists atomized by the ultrasonic vibrators 2, so that the mists atomized in an ultrasonic atomization chamber 4 are collected by the collection unit 5 for separation from the solution. In the ultrasonic separating apparatus, the tube 6 defining the spray opening 12 at the upper end is disposed above the ultrasonic vibrator 2, the tube 6 is filled with the solution, and the ultrasonic vibrator 2 applies an ultrasonic vibration to the solution, toward the spray opening 12, so that the solution is atomized into mists and released from the spray opening 12. Also, the tube 6 has a gas nozzle 14 opened for supplying a carrier gas to the mists sprayed from the spray opening 12; the gas nozzle 14 is connected to a carrier gas source; the carrier gas supplied from the carrier gas source is supplied to the mists through the gas nozzle 14; the mists sprayed from the spray opening 12 are dispersed into the carrier gas; and the atomized mists are condensed and collected in the collection unit 5.

In the ultrasonic solution separating apparatus according to the invention, the tube 6 can be a cylindrical tube, or a conical horn that is tapered toward the spray opening 12, or alternatively an exponential horn can be used as well.

In the ultrasonic solution separating apparatus according to the invention, the gas nozzle 14 can be provided around the spray opening 12. And, in the inventive ultrasonic solution separating apparatus, the carrier gas source can supply the gas nozzle 14 with an inert carrier gas such as nitrogen, helium and argon.

The inventive ultrasonic solution separating method and apparatus carries the advantage that the solution can be atomized into mists efficiently by a plurality of ultrasonic vibrators, with a reduced amount of a carrier gas. This is because, in the invention, the tube having the spray opening at the upper end is filled with the solution, the ultrasonic vibration is applied by the ultrasonic vibrator to the solution inside the tube, toward the spray opening, and the solution is atomized into the mists to be dispersed into the carrier gas through the spray opening. In the present invention, since the mists dispersed through the spray opening defined at the upper part of the tube are supplied with the carrier gas to be atomized, the mists can be efficiently atomized in a state that the carrier gas with a lower mist concentration is constantly supplied to the spray opening of the tube. Consequently, even if a plurality of ultrasonic vibrators are used, it does not happen that the mist concentration in the carrier gas becomes higher on the downstream side to decrease the efficiency of the solution being atomized into the mists. Thus, the solution can be efficiently atomized into the mists without a great amount of carrier gas having to be supplied. Therefore, in the inventive method and apparatus in which the solution can be atomized into the mists efficiently with a reduced amount of air, the recovery efficiency of condensing and collecting the atomized mists can also be increased. Furthermore, since the solution inside the tube is subjected to the ultrasonic vibration and atomized into the mists through the spray opening in the upper end, the inventive method and apparatus carry another advantage that the ultrasonic vibrator itself can atomize the solution into the mists efficiently.

BEST MODE FOR CARRYING OUT THE INVENTION

Embodiments of the present invention will now be discussed in conjunction with the accompanying drawings. It should be noted here that the following embodiments are intended to be illustrative of a method and apparatus to embody the technical ideas of the invention, and the inventive method and apparatus are, in no way, limited to the method and apparatus described below.

Further, in the present disclosure, reference numerals corresponding to members shown in the embodiments are suffixed to members shown in the "CLAIMS" and "MEANS FOR SOLVING PROBLEMS" in order to facilitate appreciation of the claims. However, the members shown in the claims shall, in no way, be specified to those members shown in the embodiments.

The ultrasonic solution separating apparatus of the invention separates a specified solution of a high concentration from a solution containing at least two substances. Although the invention is not intended to specify a solvent and/or a solute of the solution, water is a main solvent, and besides the water, other organic solvents such as alcohol can also be used. By way of example, the solution includes any of the following.

(1) refined Sake, beer, wine, table vinegar, sweet Sake for cooking, spirits, Japanese 'Shouchuu' spirits, brandy, whisky, liquor (2) any solution including a perfume, aromatic component or aroma component such as pinene, linalool, limonene, polyphenol (3) any solution including an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a substance in which these are combined (4) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a halogen (5) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a hydroxyl group (6) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with an amino group (7) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carbonyl group (8) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carboxyl group (9) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a nitro group

(10) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a cyano group

(11) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a mercapto group

(12) any solution including a substance in which any one or more atoms included in a solution of (3) to (11) above has been replaced with a metal ion

(13) any solution including a substance in which any hydrogen atom, carbon atom or functional radical in a molecule included in a solution of (3) to (11) above has been replaced with any molecule among molecules of (3) to (11) above.

When a solution containing two or more substances is ultrasonically vibrated to separate mists from the solution and such separated mists are condensed and collected, a concentration of contained substance(s) differs between the solution collected from the mists and the remaining solution which is not turned to the mists. For example, when an aqueous alcohol solution is atomized into mists by the ultrasonic vibration and the atomized mists are collected, the atomized mists thus collected have a higher concentration of alcohol than the remaining alcohol which is not turned to the mists. The reason for such higher alcohol concentration in the solution obtained by condensing and collecting the mists is that when compared with the water, the alcohol is easier to be atomized into the mists by the ultrasonic vibration.

One reason for the different concentrations of contained substances between the solution collected from the mists and the solution which is not turned to the mists is that the rate differs in terms of a surface excess resulting from the migration of the substance contained in the solution onto the solution surface. A solution with a stronger property of surface excess is more likely to have a high surface concentration, and when such solution is ultrasonically vibrated to turn the surface solution into the atomized mists, such mists have a high concentration of the substance that readily results in the surface excess. Accordingly, when the mists are condensed and collected, the concentration of the substance with a strong property of surface excess can be increased. That is, it becomes possible to separate the substance of a high concentration from the solution.

Now with alcohol being taken as an exemplary solution, an explanation shall be made on a method and apparatus for separating highly concentrated alcohol from an alcohol solution. However, the present invention does not specify the solution to be alcohol. This is because the invention can be used for separating any of the solutions that can separated in the form of atomized mists as enumerated above, as well as for separating other kinds of solutions.

The ultrasonic separating apparatuses shown in FIG. 2 through FIG. 4 respectively include an ultrasonic atomizer 1, 301, 401 for atomizing a portion of solution into the mists by ultrasonic vibration, and a collection unit 5, 305, 405 for condensing and collecting the mists atomized by the ultrasonic atomizer 1, 301, 401. The ultrasonic atomizer 1, 301, 401 includes an ultrasonic atomization chamber 4, 304, 404 of a closed structure where the solution is supplied; a plurality of ultrasonic vibrators 2; 302, 402 for ultrasonically vibrating the solution supplied in the ultrasonic atomization chamber 3, 304, 404 to atomize the solution into the mists; tubes 6, 306, 406 disposed respectively above each of the ultrasonic vibrators 2, 302, 402; and ultrasonic electric power sources 3, 303, 403 connected to the ultrasonic vibrators 2, 302, 402.

In the ultrasonic separating apparatus shown in FIG. 2, the ultrasonic atomization chamber 4 and the collection unit 5 are separated from each other and connected via a circulation duct 7. In the ultrasonic separating apparatus shown in FIG. 3, the ultrasonic atomization chamber 304 is incorporated in the collection unit 305; and in the ultrasonic separating apparatus shown in FIG. 4, the collection unit 405 and the ultrasonic atomization chamber 404 constitute one unit of airtight chamber, with the collection unit 405 and the ultrasonic atomization chamber 404 being of an integrated structure.

In these ultrasonic separating apparatuses, the mists of a solution atomized in the ultrasonic atomization chamber 4, 304, 404 are allowed to flow into the collection unit 5, 305, 405 of a closed structure. The collection unit 5, 305, 405 condenses the fine mists and collects the mists as a highly concentrated alcohol solution. Since the mists are not a gas, the mists can be condensed and collected without necessarily being cooled. However, when cooled, the mists can be collected rapidly.

The solution is supplied to the ultrasonic atomization chamber 4, 304, 404 by using a pump 10, 310, 410. The ultrasonic atomization chamber 4, 304, 404 is designed not to atomize the entirety of the supplied solution into the mists. This is because if the whole solution were to be atomized and collected in the collection unit 5, 305, 405, the concentration of the target substance such as alcohol in the solution collected in the collection unit 5, 305, 405 would become the same as in the solution supplied to the ultrasonic atomization chamber 4, 304, 404. The concentration of the target substance in the solution supplied to the ultrasonic atomization chamber 4, 304, 404 decreases as the solution atomized into the mists decreases in volume. Consequently, the concentration of the target substance contained in the mists also decreases gradually. When the concentration of the target substance decreases, the solution in the ultrasonic atomization chamber 4, 304, 404 is replaced with a new solution.

By way of example, the ultrasonic atomization chamber 4, 304, 404 atomizes a solution in which the concentration of the target substance is 10 to 50% by weight, and after the concentration of the target substance has decreased, the solution is replaced with a new solution. The solution is exchanged in a method of replacing the solution with a new one when a predetermined time has elapsed, i.e. in a batch system. However, it is also possible to connect a starting solution tank 11, 311, 411, which reserves the solution, via a pump 10, 310, 410 to the ultrasonic atomization chamber 4, 304, 404 so that the solution can be continuously supplied from the starting solution tank 11, 311, 411. In this apparatus, the solution from the starting solution tank 11, 311, 411 continues to be supplied while the solution in the ultrasonic atomization chamber 4, 304, 404 is fed out, so that the concentration of the target substance such as alcohol in the solution is prevented from decreasing in the ultrasonic atomization chamber 4, 304, 404. And, as indicated by arrow A in FIG. 2, it is also possible for the solution in the ultrasonic atomization chamber 4 to be discharged to outside instead of being circulated back to the starting solution tank 11, so that the concentration of the target substance contained in the starting solution tank 11 is prevented from decreasing.

The solution in the ultrasonic atomization chamber 4, 304, 404 is atomized into the mists by the ultrasonic atomizer 1, 301, 401. The concentration of the target substance in the mists atomized by the ultrasonic atomizer 1, 301, 401 is higher than in the solution. Therefore, when the solution is atomized into the mists by the ultrasonic atomizer 1, 301, 401 and the mists are condensed and collected, a highly concentrated solution can be separated with high efficiency.

The ultrasonic atomization chamber 4, 304, 404 is provided with tubes 6, 306, 406. The tubes 6, 306, 406 are respectively disposed above each of the ultrasonic vibrators 2, 302, 402, and cause the mists to be dispersed efficiently from the solution ultrasonically vibrated by the ultrasonic vibrator 2, 302, 402. The tube 6, 306, 406 is tubular with a spray opening 12, 312, 412 being defined at the upper end. The inside of the tube 6, 306, 406 is filled with the solution, and the ultrasonic vibration is applied to the solution in the tube 6, 306, 406, toward the spray opening 12, 312, 412 so that the solution is atomized into the mists through the spray opening 12, 312, 412. The illustrated ultrasonic vibrator 2, 302,402 emits an ultrasonic wave upwardly. Accordingly, each of the tubes 6, 306, 406 is disposed above the corresponding ultrasonic vibrator 2, 302, 402 in a vertical orientation. The illustrated tube 6, 306, 406 is a conical horn that is tapered toward the upper end. Alternatively, however, the tube can be an exponential horn with its interior shape being exponentially curved. The tube 6, 306, 406 such as a conical horn and an exponential horn is featured in that the tube allows the ultrasonic vibration to be effectively transmitted inside the tube and the solution can be atomized into the mists efficiently. In this invention, however, the tube may also be cylindrical, elliptical or polygonal.

The internal shape of the lower end opening of the tube 6, 306, 406 is made smaller or larger than the profile of the ultrasonic vibrator 2, 302, 402 so that the ultrasonic vibration can be efficiently transmitted inside, and thus an ultrasonically vibrated liquid column P rises along the interior surface of the tube. For example, the inner diameter of the lower end opening of the tube 6, 306, 406 is 50 to 150%, preferably 60 to 100%, of the outer diameter of the ultrasonic vibrator 2, 302, 402.

Further, the height of the tube 6, 306, 406 and the size of the spray opening 12, 312, 412 are so designed that a layer of air is not formed along the inside of the tube 6, 306, 406 or, in other words, between the interior surface of the tube 6, 306, 406 and the liquid column P, while the liquid column P rises along the inside of the tube 6, 306, 406 and is dispersed, in the form of atomized mists, in the vicinity of the spray opening 12, 312, 412. Alternatively, however, it can be so designed that the tip of liquid column P projects outside the spray opening 12, 312, 412 or, in other words, the tube 6, 306, 406 is lower in height than is the liquid column P. Thus, the height of the tube 6, 306, 406 and the size of the spray opening 12, 312, 412 are designed to obtain optimal values in accordance with factors such as the size, output and frequency regarding the ultrasonic vibrator 2, 302, 402.

The illustrated tube 6, 306, 406 has its lower end disposed below the liquid surface of the solution and its spray opening 12, 312, 412 disposed above the liquid surface. The tube 6, 306, 406 guides the ultrasonic vibration below the liquid surface into its inside and allows the solution to be dispersed in the form of mists through the spray opening 12, 312, 412 which is above the liquid surface.

The tube 6 in FIG. 5 is disposed above and away from the ultrasonic vibrator 2, and the tube 606, 706 in FIG. 6 and FIG. 7 respectively has an ultrasonic vibrator 602, 702 disposed at the bottom and has its lower end opening closed liquid tightly by the ultrasonic vibrator 602, 702. The tube 606, 706 with its lower end closed by the ultrasonic vibrator 602, 702 defines an inlet aperture 613, 713 for supplying the solution inside.

Further, the tube 706 in FIG. 7 is divided into a plurality of branch tubes 706A, 706A. Each of the branch tubes 706A, 706A is a conical horn tapered toward its upper end. Each of the branch tubes 706A, 706A defines an opening at its lower end and also a spray opening 712, 712 at its upper end. The boundary between adjacent branch tubes 706A, 706A is tapered toward the lower end and is sharp at its lower end edge so that the ultrasonic vibration can be efficiently transmitted inside the branch tubes 706A, 706A by reducing reflection of the ultrasonic vibration. Each of the branch tubes 706A, 706A defines an inlet aperture 713 to allow the solution to be supplied inside. The solution is supplied to the tube 706 through the inlet aperture 713. The ultrasonic vibration emitted from the ultrasonic vibrator 702 is branched and guided into the plurality of branch tubes 706A through the supplied solution. Inside each of the branch tubes 706A, 706A, the solution is ultrasonically vibrated to form a liquid column and dispersed in the form of atomized mists from the spray opening 712, 712 at the top.

Also, the tube 6, 606, 706 has a gas nozzle 14, 614, 714 defined for supplying the carrier gas to the mists being atomized through the spray opening 12, 612, 712, and the gas nozzle 14, 614, 714 is connected to a carrier gas supply source. The carrier gas fed out of the carrier gas supply source is supplied to the mists through the gas nozzle 14, 614, 714, so that the mists sprayed through the spray opening 12, 612, 712 are atomized in the carrier gas. The carrier gas containing the mists thus atomized is condensed into a solution and collected in the collection unit 5, 605, 705.

The tube 6, 606, 706 in FIG. 5 through FIG. 7 has a double-wall structure forming a duct 15, 615, 715 between the walls. The duct 15, 615, 715 is connected to the gas nozzle 14, 614, 714 opening at the upper end of the tube 6, 606, 706. The carrier gas supplied to the duct 15, 615, 715 is discharged through the gas nozzle 14, 614, 714. The gas nozzle 14, 614, 714 is a slit-shaped opening that runs around the upper end of the tube 6, 606, 706. The slit-shaped gas nozzle 14, 614, 714 delivers the carrier gas in a ring form. The mists are discharged to the inside of the carrier gas delivered in a ring form. A tube 6, 606, 706 of this structure allows the mists to be sprayed to the inside of a fresh carrier gas. Consequently, the solution can be atomized into the mists efficiently. This is because the mists are atomized into the carrier gas that has a less concentrated solution.

The tube 6, 606, 706 in FIG. 5 through FIG. 7 is removably connected to a connection duct 16, 616, 716. Although not shown, a plurality of tubes are connected to the connection duct 16, 616, 716. The tube 6 in FIG. 5 has a male thread 17 provided around its lower end, and a hole with a female thread 18 is defined in the connection duct 16 to allow the male thread 17 of the tube 6 to be screwed in. The tube 6 is connected to the connection duct 16 by the male thread 17 being screwed into the hole with the female thread 18. The connection duct 16 has a carrier gas supply duct 19 inside. When the tube 6 is connected to the supply duct 19 in the connection duct 16, an inlet aperture of the duct 15 is connected to the supply duct 19 in the connection duct 16, and the carrier gas is supplied to the duct 15 in the tube 6 through the supply duct 19 in the connection duct 16. The tube 6 in FIG. 5 has an annular groove provided respectively above the male thread 17 and in the bottom face, and O-rings 20, 21 are inserted respectively in the groove. When the tube 6 is connected to the connection duct 16, the O-rings 20, 21 serve to seal the inner face of the hole having the female thread 18 to prevent a gas leakage through the joint between the connection duct 16 and the tube 6. That is, the tube 6 is joined to the connection duct 16 in an airtight state.

The tube 606, 706 in FIG. 6 and FIG. 7, respectively, has a cylindrical connecting part 622, 722 at its lower end, and a connecting hole 623, 723 for this connecting part 622, 722 to be inserted into is defined in the connection duct 616, 716. The connecting hole 623, 723 is extended vertically through the connection duct 616, 716. To prevent a gas leakage between the connecting part 622, 722 and the connecting hole 623, 723, an O-ring 620, 720 is inserted in an annular groove provided at the top of the connecting part 622, 722, and an O-ring 621, 721 is inserted in an annular groove provided in the bottom of the connecting hole 623, 723. The O-rings 620, 720, 621, 721 serve to seal a gap between the connecting part 622, 722 and the connecting hole 623, 723 and connect the tube 606, 706 to the connection duct 616, 716 airtightly so as to prevent a leakage of gas. When the tube 606, 706 is connected to the connection duct 616, 716, an inlet aperture of the duct 615, 715 in the tube 606, 706 is connected to a supply duct 619, 719 in the connection duct 616, 716, and the carrier gas is supplied to the duct 615, 715 in the tube 606, 706 through the supply duct 619, 719 in the connection duct 616, 716.

Further, each of these illustrated tubes 606, 706 has an ultrasonic vibrator 602, 702 removably connected to the tube via a removable connector 624, 724. Inside the removable connector 624, 724 is a mounting chamber 625, 725 that opens upwardly. The ultrasonic vibrator 602, 702 is fixed in this mounting chamber 625, 725. The illustrated removable connector 624, 724 also accommodates, in the mounting chamber 625, 725, a power supply circuit component 626, 726 for driving the ultrasonic vibrator 602, 702. The power supply circuit component 626, 726 is connected to the ultrasonic vibrator 602, 702 via a lead wire 627, 727 and outputs an ultrasonic power of electrical signal to the ultrasonic vibrator 602, 702. The ultrasonic vibrator 602, 702 seals the opening of the mounting chamber 625, 725 airtightly. Accordingly, the periphery of the ultrasonic vibrator 602, 702 is in firm contact with the rim of the opening of the mounting chamber 625, 725 via a gasket 628, 728. The power supply circuit component 626, 726 is received in the mounting chamber 625, 725 which is sealed watertightly by the ultrasonic vibrator 602, 702. Because of this structure, the power supply circuit component 626, 726 is not required to be of a watertight structure. Because the illustrated removable connector 624, 724 incorporates the ultrasonic vibrator 602, 702 and the power supply circuit component 626, 726 in the mounting chamber 625, 725, the removable connector carries the advantage that the ultrasonic vibrator 602, 702 and the power supply circuit component 626, 726 can be replaced easily. Alternatively, however, the removable connector can be so designed that only the ultrasonic vibrator is received in the mounting chamber, and that the lead wire, connecting to the ultrasonic vibrator 602, 702, is led out and connected to a power supply circuit outside the removable connector. In such a removable connector, the ultrasonic vibrator does not necessarily have to be fixed in a manner of a watertight structure.

The removable connector 624, 724 is removably connected to a connecting recess 629, 729 defining an inverted opening in the lower end of the tube 606, 706. The connecting recess 629, 729 has a female thread provided on its inner face. The removable connector 624, 724 is so profiled as to be inserted into the connecting recess 629, 729 and is exteriorly threaded to be screwed into the female thread of the connecting recess 629, 729. By screwing the male thread into the female thread, the removable connector 624, 724 is connected to the connecting recess 629, 729. Because the connecting recess 629, 729 is communicated with the inside of the tube 606, 706, the removable connector 624, 724 must be connected to the tube

606, 706 in a manner of liquid-tight structure. For this purpose, the O-ring 630, 730 is interposed between the inner circumference of the connecting recess 629, 729 and the outer circumference of the removable connector 624, 724. Owing to the O-ring 630, 730 being liquid-tightly connected to the removable connector 624, 724, the connecting recess 629, 729 in the lower end of the tube 606, 706 is sealed liquid tightly by the removable connector 624, 724.

In the ultrasonic atomizer 1, 301, 401, 601, 701 described above, the ultrasonic vibrator 2, 302, 402, 602, 702 is ultrasonically vibrated and the solution is dispersed through the spray opening 12, 312, 412, 612, 712 of the tube 6, 306, 406, 606, 706 in the form of mists. The solution is dispersed in the form of mists from the spray opening 12, 312, 412, 612, 712 by being ultrasonically vibrated within the tube 6, 306, 406, 606, 706. In the illustrated ultrasonic atomizer 1, 301, 401, 601, 701, the ultrasonic vibrator 2, 302, 402, 602, 702 is disposed to face upwardly. The ultrasonic vibrator 2, 302, 402, 602, 702 radiates an ultrasonic wave upwardly from the bottom toward the inside of the tube 6, 306, 406, 606, 706, ultrasonically vibrates the solution, pushes up the solution inside the tube 6, 306, 406, 606, 706, and disperses the solution in the form of mists through the spray opening 12, 312, 412, 612, 712. The ultrasonic vibrator 2, 302, 402, 602, 702 emits the ultrasonic wave in a vertical direction.

The ultrasonic atomizer 1 shown in FIG. 2 includes a plurality of ultrasonic vibrators 2 and ultrasonic electric power sources 3, the power sources causing these ultrasonic vibrators 2 to be ultrasonically vibrated. The ultrasonic vibrator 2 is fixed below the tube 6.

The mists of the solution atomized in the ultrasonic atomization chamber 4 are allowed to flow into the collection unit 5. To allow the mists to flow into the collection unit 5, in the apparatus shown in FIG. 2 the collection unit 5 is connected to the ultrasonic atomization chamber 4 via the circulating duct 7; in the apparatus shown in FIG. 3 the ultrasonic atomization chamber 304 is built into the collection unit 305; and in the apparatus shown in FIG. 4 the ultrasonic atomization chamber 404 is disposed on the top of the collection unit 405. In the apparatus shown in FIG. 3 and FIG. 4, the volume of the collection unit 305, 405 is set to be sufficiently large as compared with the volume of the ultrasonic atomization chamber 304, 404, being set to be, for example, 2 to 100 times or preferably 5 to 50 times or even more preferably 5 to 20 times the volume of the ultrasonic atomization chamber 304, 404. In the apparatus shown in FIG. 4, the ultrasonic atomization chamber 404 and the upper part of the collection unit 405 are connected via a duct 408 which constitutes a communication passage, forming an integrated structure. The mists atomized in the ultrasonic atomization chamber 404 fall slowly and are collected, as a solution, in the collection unit 405.

Also, in the apparatus shown in FIG. 2, to collect and circulate the mists, dispersed from the spray opening 12 of the tube 6, through the circulation duct 7 efficiently, a mist intake 9 is provided above the spray opening 12 of the tube 6. The intake 9 is a cylindrical pipe and is disposed in a vertical orientation above the tube 6. The intake 9 as a cylindrical pipe has its lower end disposed above the tube 6 and the upper end extended upwardly in the ultrasonic atomization chamber 4. In the illustrated intake 9, the lower end edge of the cylindrical pipe is positioned at the upper end edge of the tube 6. Alternatively, however, the intake may have its lower end part disposed to lap over the upper end of the tube or its lower end edge disposed away from the upper end edge of the tube. Also, the opening in the lower end of the intake 9 is of a larger opening area than the spray opening 12 of the tube 6, so that all of the mists dispersed from the upper end of the tube 6 can be collected. The upper end of the intake 9 is connected to the top of the ultrasonic atomization chamber 4 and such connection is linked to the circulation duct 7, so that the mists collected by the intake 9 are circulated to the circulation duct 7. However, the intake does not necessarily have to be provided.

The collection unit 5 in FIG. 2 incorporates a cooling heat-exchanger 33 for cooling and condensing the mists. The cooling heat-exchanger 33 has fins (not shown) fixed to a heat-exchanger pipe 34. A coolant or cooling water is circulated through the heat-exchanger pipe 34 to cool the heat-exchanger 33. Although some of the mists atomized in the ultrasonic atomization chamber 4 may evaporate and turn to a gas, such gas, being cooled by the heat-exchanger 33 in the collection unit 5, is condensed into dew to be collected. The mists, flowing into the collection unit 5, impinge upon the heat-exchanger 33 or upon other mists to form larger particles and are thus collected as a solution. After the mists and gas have been condensed by the heat-exchanger 33, air is collected and circulated to the ultrasonic atomization chamber 4 again through the circulation duct 7.

And, although not illustrated, the collection unit can be so designed that a vapor of target substance such as alcohol contained in the carrier gas is absorbed into an absorbing agent and collected. In such collection unit, for example, the alcohol absorbed into the absorbing agent can be removed by using a heated recovery gas, and the recovery gas is then cooled to condense and recover the removed alcohol. Such a collection unit can be constituted of a rotor with the absorbing agent provided in an air gap and a rotational drive mechanism for rotating the rotor. The rotor is a honeycomb rotor having the air gap through which a carrier gas can pass in the direction of the rotational axis. As the absorbing agent, for example, any one of zeolite, activated carbon, lithium oxide and silica gel or a mixture of them can be used. In this collection unit, the rotor is rotated at a predetermined speed by means of the rotational drive mechanism and moved between an absorbing region in which the vapor is absorbed and a releasing region in which the absorbed vapor is released. When the rotor is moved into the absorbing region, the carrier gas containing the vapor of alcohol that is the target substance is passed through the air gap, and the alcohol as a target substance is absorbed by the absorbing agent. When the rotor is rotated and moved into the releasing region, the absorbed alcohol as a target substance is released. The released alcohol as a target substance is recovered by cooling the recovery gas. The carrier gas having been passed through the absorbing region of the rotor is moved back to the ultrasonic atomization chamber again.

The collection unit 305, 405 shown in FIG. 3 and FIG. 4 is of a closed chamber, and the mists supplied to the chamber are not released to outside. Therefore, the mists supplied to the collection unit 305, 405 impinge upon each other to be condensed into larger dew, or impinge upon a baffle to be condensed into larger dew, and are collected as a solution. To collect the mists more rapidly in the collection unit 305, 405, the collection unit 305, 405 shown in FIG. 3 and FIG. 4 has a nozzle 336, 436 for spraying the solution. The nozzle 336, 436 is connected to the bottom of the collection unit 305, 405 via a circulation pump 335, 435. The circulation pump 335, 435 takes in the solution collected in the collection unit 305, 405 and sprays the solution from the nozzle 336, 436.

In the illustrated ultrasonic separating apparatus, the nozzle 336, 436 is disposed at an upper portion and lateral portions of the collection unit 305, 405. The nozzle 336, 436 at the upper portion sprays the solution downwardly. The nozzle 336, 436 at the lateral portion sprays the solution horizontally. The solution thus sprayed from the nozzle 336, 436 is in the form of droplet which is sufficiently larger than the mists atomized in the ultrasonic atomizer 301, 401 and falls rapidly inside the collection unit 305, 405. And so, when the droplet falls, it collides with the mists floating inside the collection unit 305, 405 and collects the mists while falling. Therefore, the mists floating in the collection unit 305, 405 can be collected rapidly with good efficiency.

Although the illustrated ultrasonic separating apparatus has the nozzle 336, 436 disposed at the upper portion and at the lateral portions, the nozzle may also be disposed at the bottom of the collection unit 305, 405. The nozzle at the bottom sprays the solution upwardly. The nozzle sprays the solution at such a speed that the solution strikes the ceiling of the collection unit 305, 405, or at such a speed that the solution ascends to the proximity of the ceiling. Because the solution sprayed so as to ascend to the proximity of the ceiling turns its direction to a downward orientation in the proximity of the ceiling and falls, the solution comes in contact with the mists while the solution rises and falls, and thus the mists can be collected effectively.

Further, a plurality of baffles 837 are disposed inside the collection unit 805 shown in FIG. 8. The baffles 837 are disposed in a vertical orientation, with adjacent baffles being spaced apart from each other to allow the mists to pass through. The vertically disposed baffle 837 is so designed that the mists are impinged upon and attached to the surface of the baffle so that the solution spontaneously flows downwardly to be collected. The illustrated baffle 837 has an uneven or rugged surface so that the mists may be in better contact with the surface and collected more efficiently.

Further, the collection unit 805 in FIG. 8 is provided with a fan 838 for forcibly blowing and agitating the mists. The fan 838 is intended to agitate the mists within the collection unit 805. The mists thus agitated impinge upon each other and are condensed, or impinge upon the surface of the baffle 837, and thus the mists are condensed. Such condensed mists rapidly fall downwardly and are collected. The illustrated fan 838 is so designed as to blow the mists downwardly for circulation within the collection unit 805. In this Figure, the ultrasonic atomizer is designated by 801, the ultrasonic vibrator by 802, the ultrasonic electric power source by 803, the ultrasonic atomization chamber by 804, and the tube by 804, respectively.

In the ultrasonic separating apparatus shown in FIG. 9, the collection unit 905 is provided with a mist vibrator 939 for enhancing the probability of the mists impinging upon each other through vibration. The mist vibrator 939 includes an electrical-to-mechanical oscillation converter for vibrating the gas in the collection unit 905, and an electric vibration source for driving the electrical-to-mechanical oscillation converter. The electrical-to-mechanical oscillation converter is exemplified by a device such as a speaker for emitting a sound at an audible frequency or an ultrasonic vibrator for emitting an ultrasonic wave ranging higher than the audible frequency. In order to efficiently vibrate the mists, the electrical-to-mechanical oscillation converter resonates, in the collection unit 905, the vibration emitted from the electrical-to-mechanical oscillation converter. To accomplish this operation, the electrical-to-mechanical oscillation converter performs the vibration at such a frequency as may resonate in the collection unit 905. In other words, the collection unit 905 is so designed to resonate with the vibration emitted from the electrical-to-mechanical oscillation converter. In this Figure, the ultrasonic atomizer is designated by 901, the ultrasonic vibrator by 902, the ultrasonic electric power source by 903, the ultrasonic atomization chamber by 904, and the tube by 906, respectively.

Since the ultrasonic wave is a frequency ranging higher than a frequency audible to the human, the ultrasonic sound is not audible. For this reason, the mist vibrator 939 for emitting the ultrasonic wave is sonically harmless to the human when the gas is vehemently vibrated in the collection unit 905, that is, when the output from the electrical-to-mechanical oscillation converter is extremely increased. As such, the ultrasonic wave carries the advantage that the mists can be vehemently vibrated by the ultrasonic Wave and efficiently impinged for a rapid collection.

Since the above-described ultrasonic separating apparatus is so constructed and arranged that a device for condensing the mists efficiently is disposed in the collection unit 5, 305, 405, 805, 905, the mists can be condensed into a highly concentrated solution more rapidly. Also, although not illustrated, the inventive ultrasonic solution separating apparatus can have a nozzle for spraying the solution, a fan for agitating the mists, and a vibrator for vibrating the mists, in a full set built inside the collection unit, so that the mists can be condensed with the highest efficiency. Alternatively, two units of such devices for condensing the mists may be incorporated to condense the mists efficiently.

The ultrasonic atomization chamber 4, 304, 404, 804, 904 and the collection unit 5, 305, 405, 805, 905 are preferably filled with an inactive gas. In this apparatus, the inactive gas prevents a deterioration of the solution in the ultrasonic atomization chamber 4, 304, 404, 804, 904 and the collection unit 5, 305, 405, 805, 905. As such, it becomes possible to obtain a highly concentrated solution in a state of higher quality.

INDUSTRIAL APPLICABILITY

The ultrasonic solution separating method and apparatus, embodied in accordance with the present invention, can be used to separate a highly concentrated solution of a specific substance from a mixture containing two or more substances or to separate a target substance contained in a solution, like when separating alcohol of a higher concentration from alcohol of a lower concentration.

DESCRIPTION OF REFERENCE NUMERAL

Figure 1:
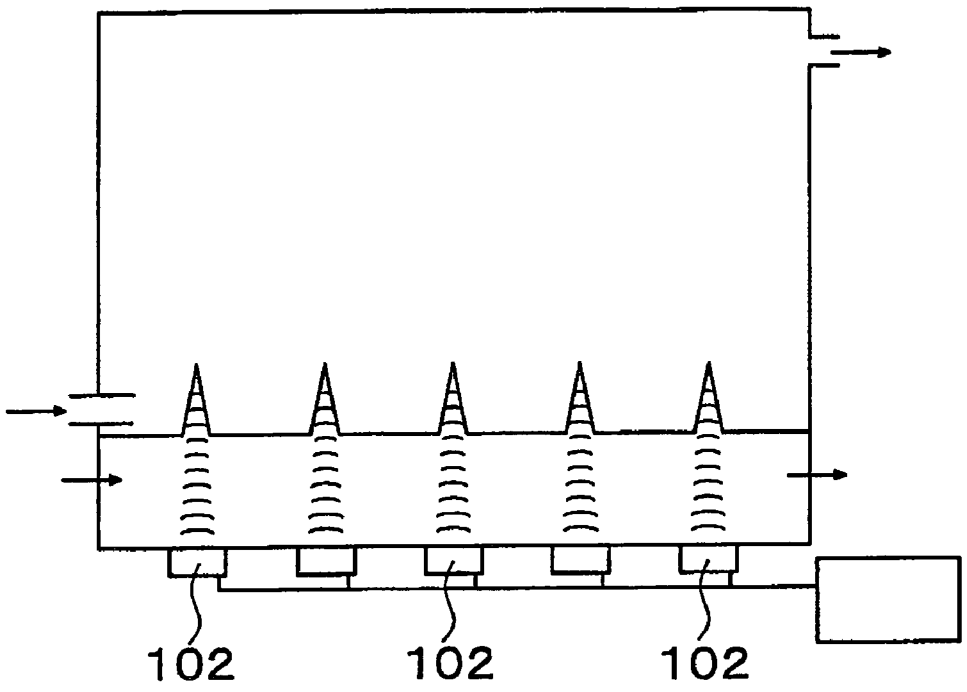
FIG. 1 is a sectional view showing schematically how a conventional type of ultrasonic separating apparatus atomizes a solution into mists by using a multitude of ultrasonic vibrators.
Figure 2:
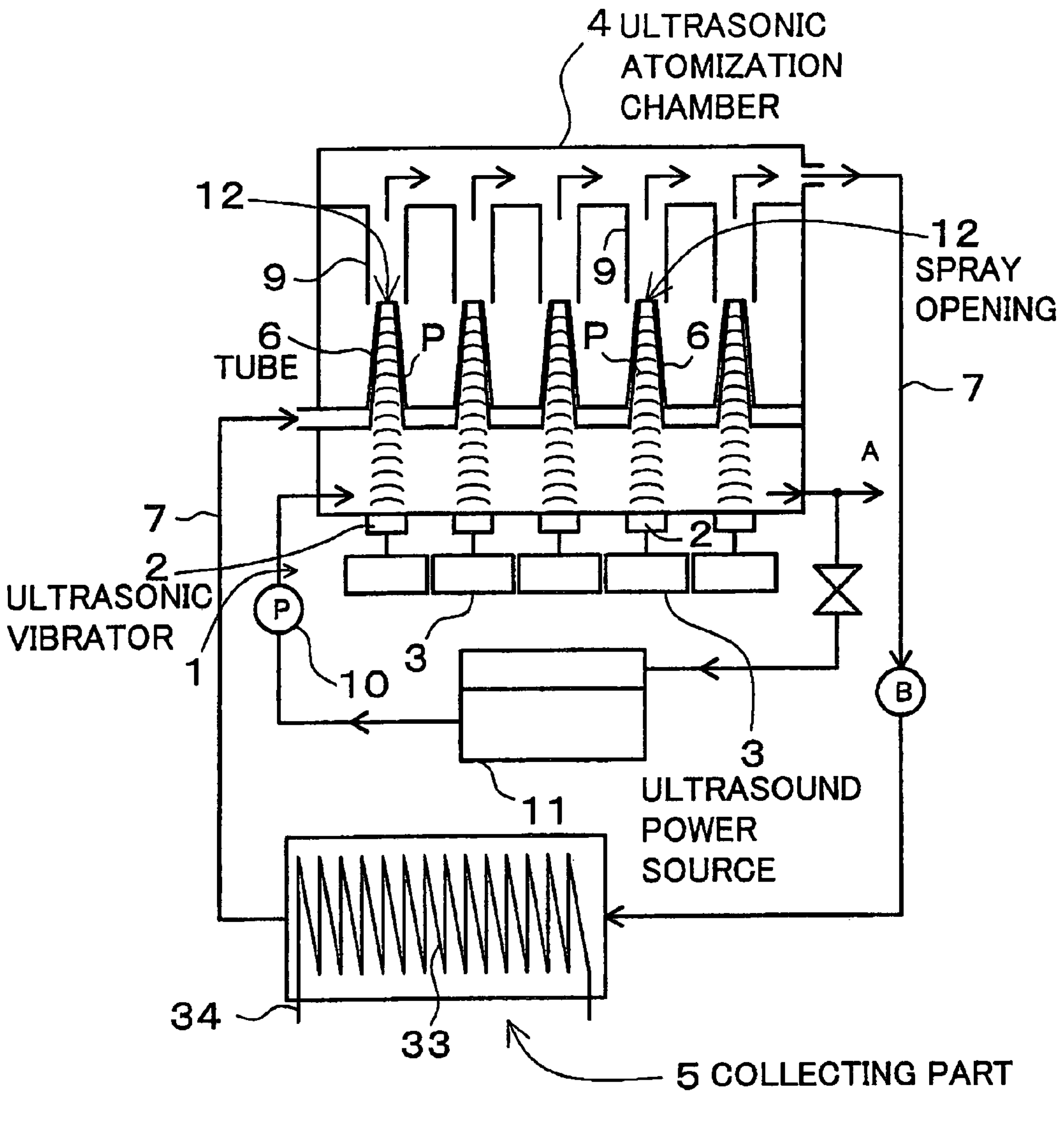
FIG. 2 is a schematic view showing the ultrasonic solution separating apparatus according to an embodiment of the present invention.
Figure 3:
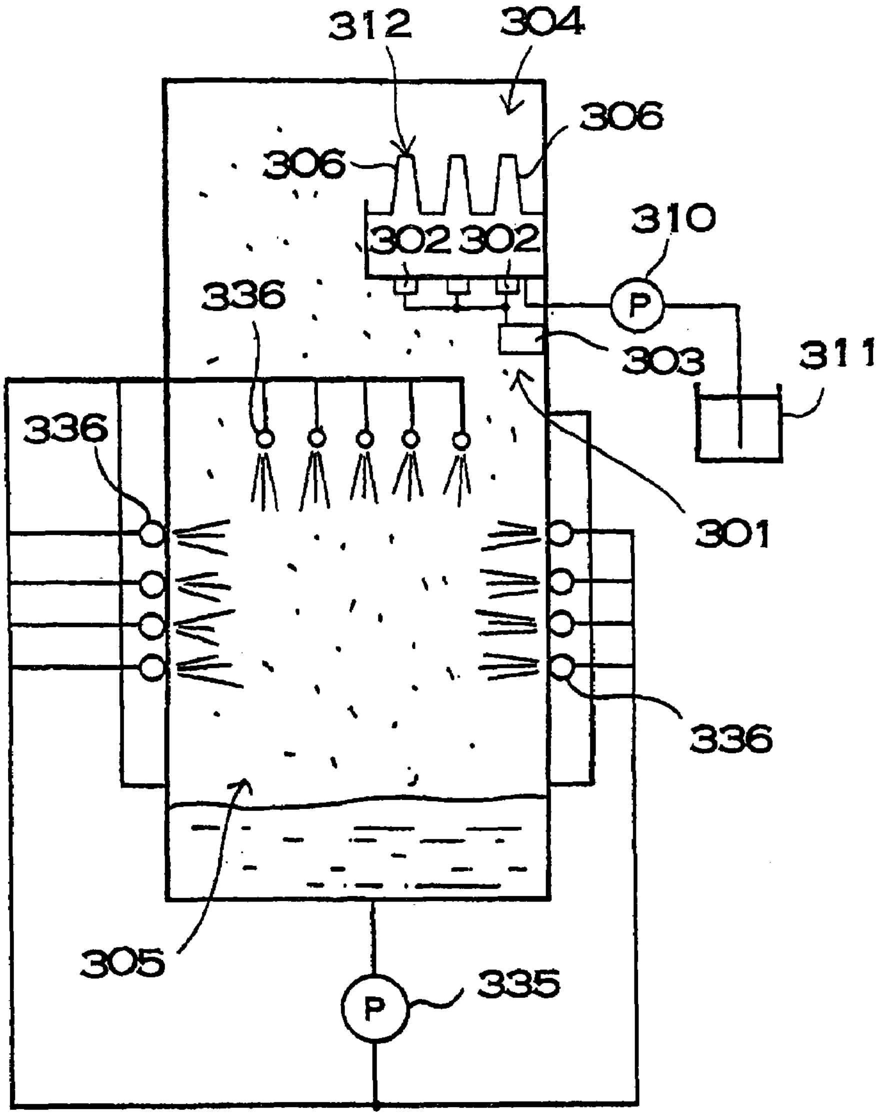
FIG. 3 is a schematic view showing the ultrasonic solution separating apparatus according to another embodiment of the invention.
Figure 4:
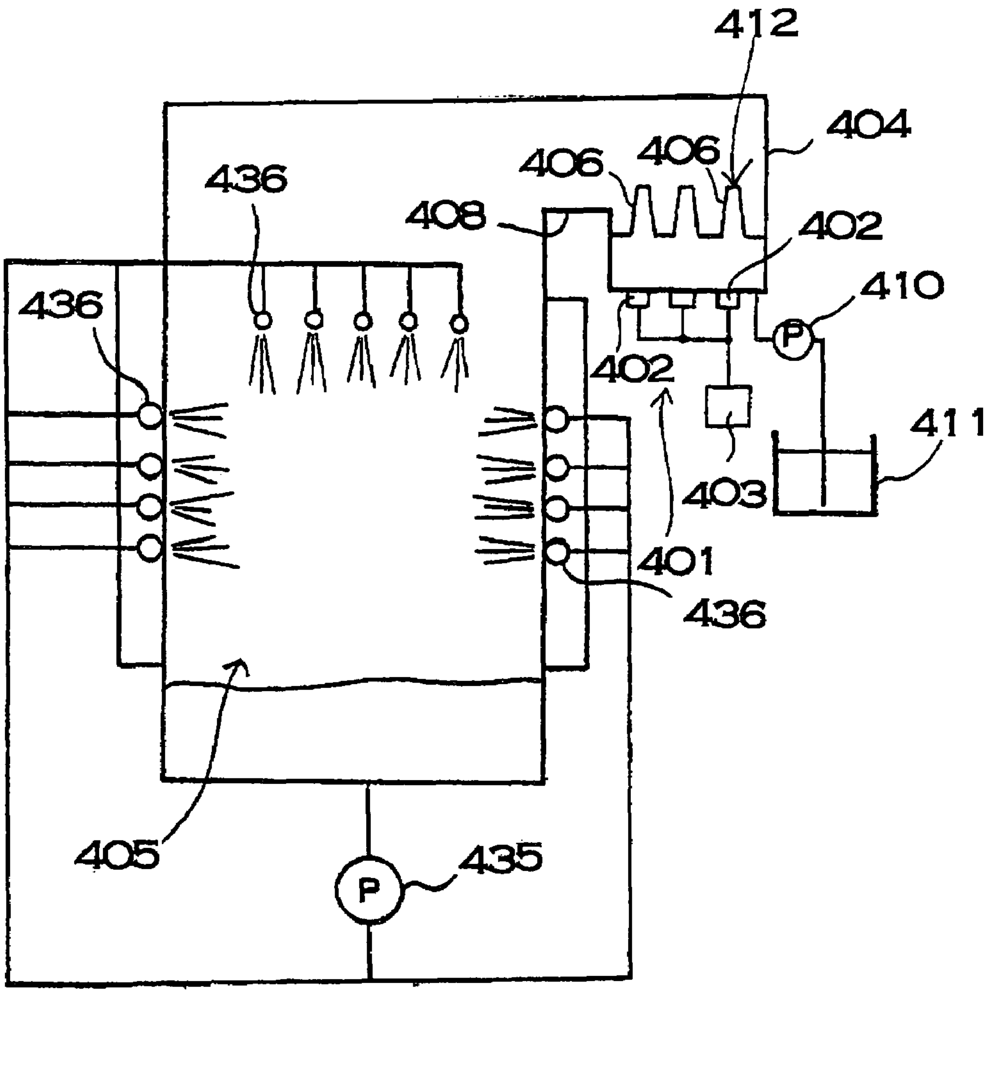
FIG. 4 is a schematic view showing the ultrasonic solution separating apparatus according to yet another embodiment of the invention.
Figure 5:
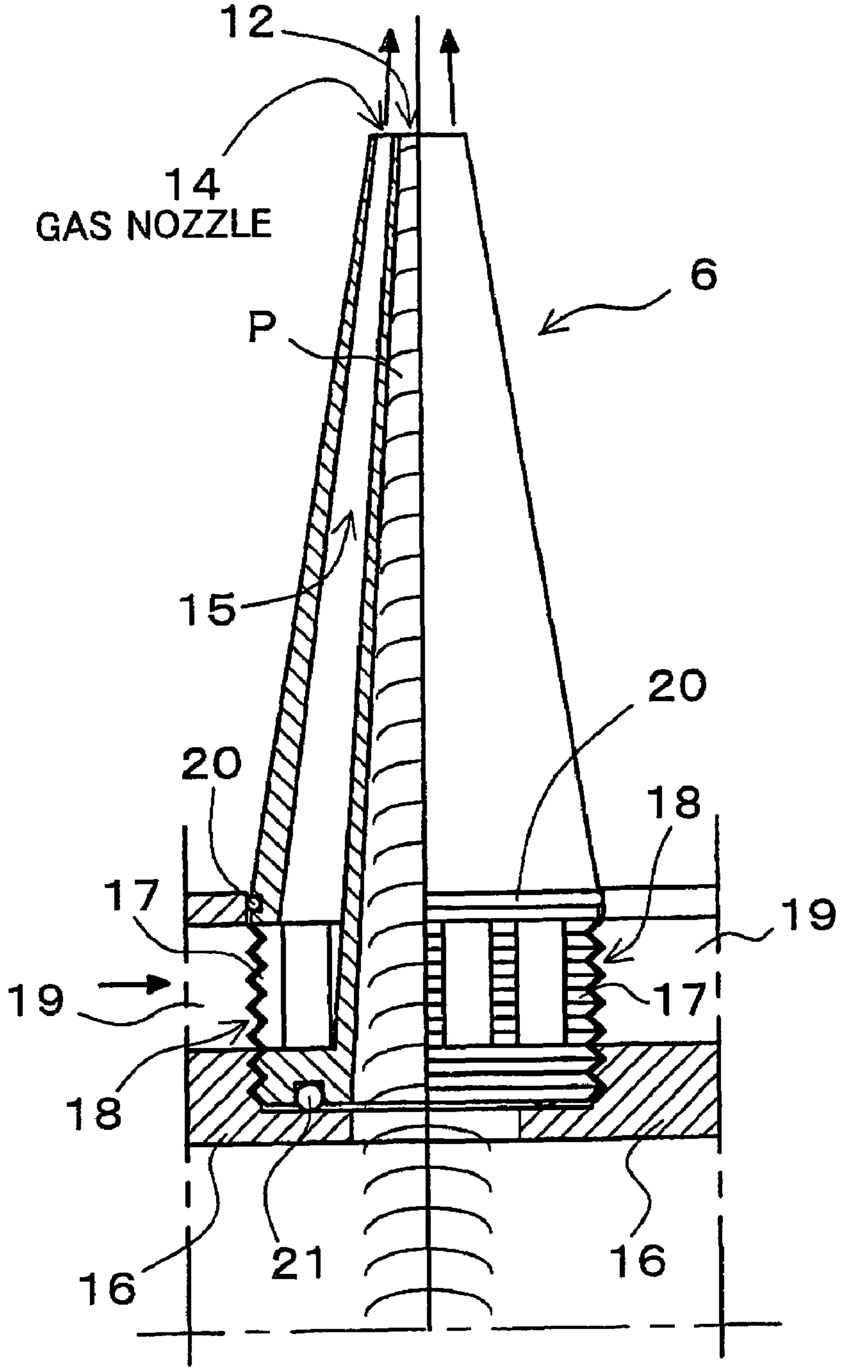
FIG. 5 is a sectional front view showing the tube in the ultrasonic separating apparatus shown in FIG. 2.
Figure 6:
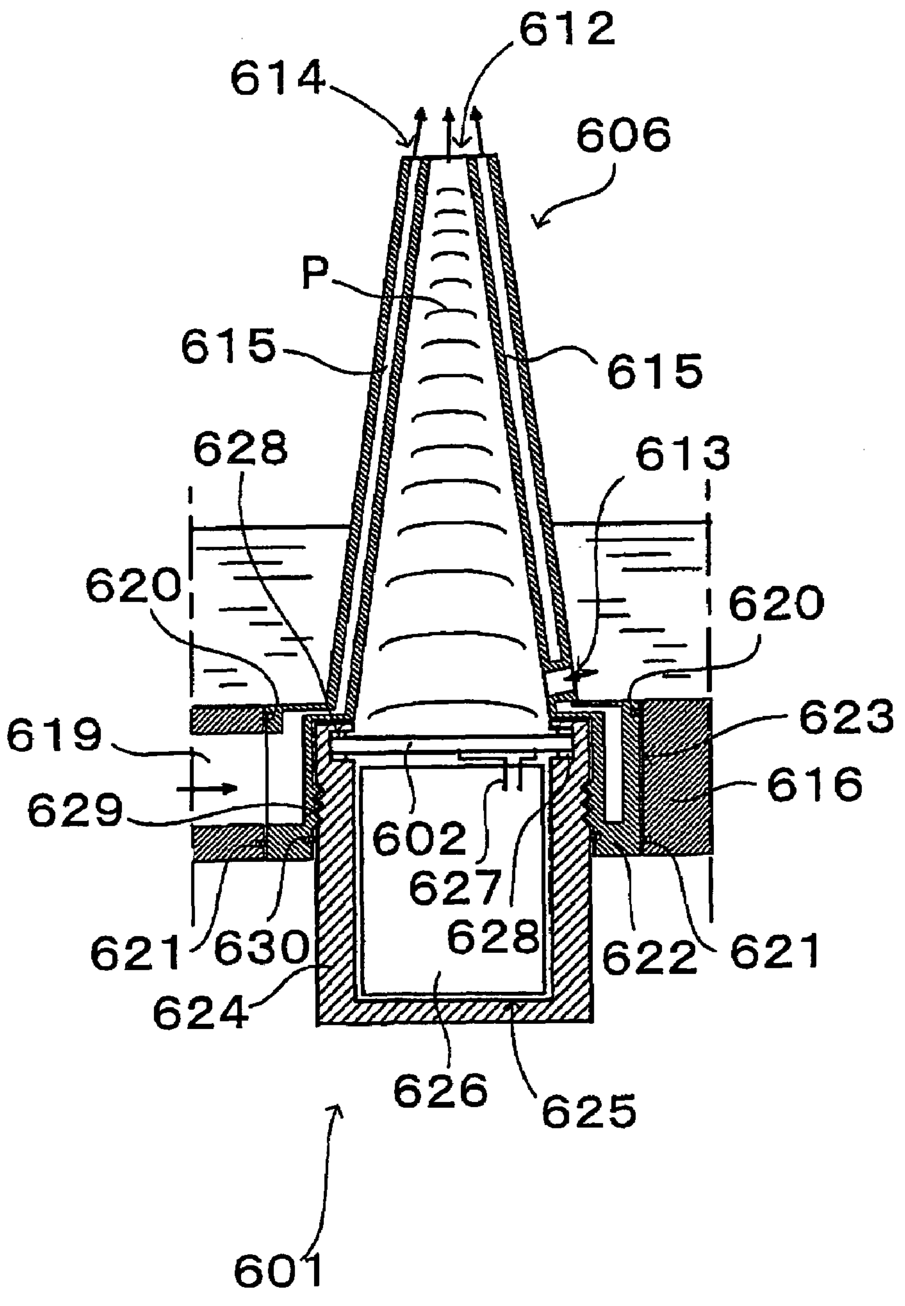
FIG. 6 is a sectional front view showing another example of the tube.
Figure 7:
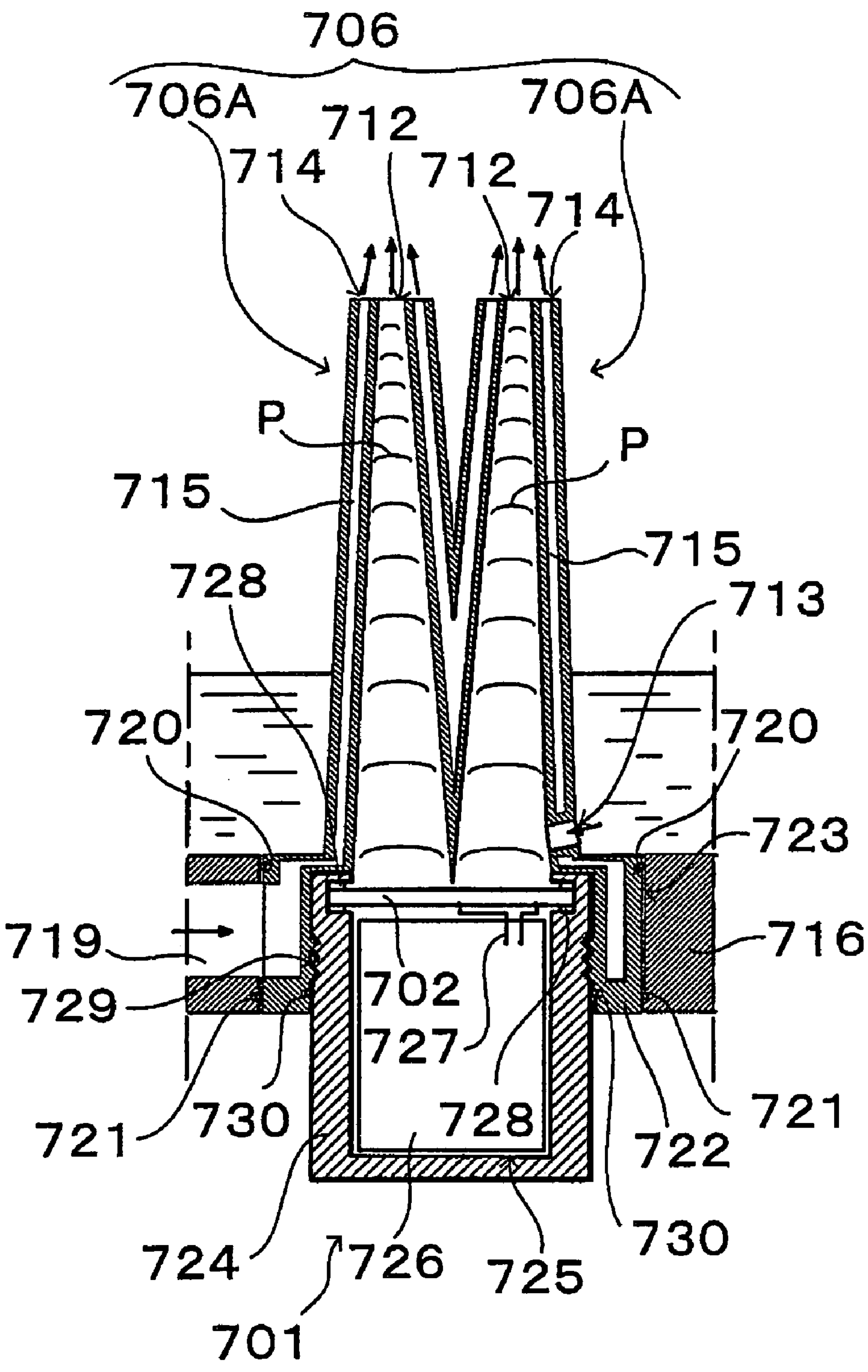
FIG. 7 is a sectional front view showing yet another example of the tube.
Figure 8:
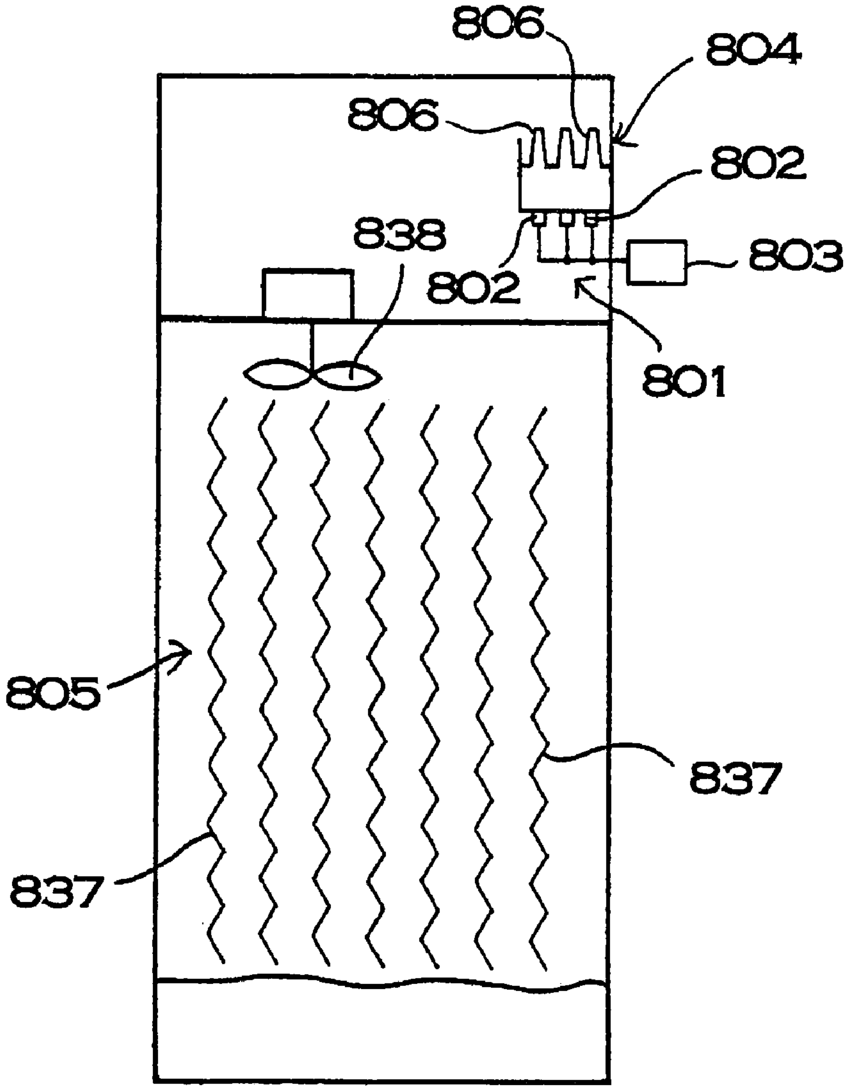
FIG. 8 is a schematic view showing the ultrasonic solution separating apparatus according to another embodiment of the invention.
Figure 9:
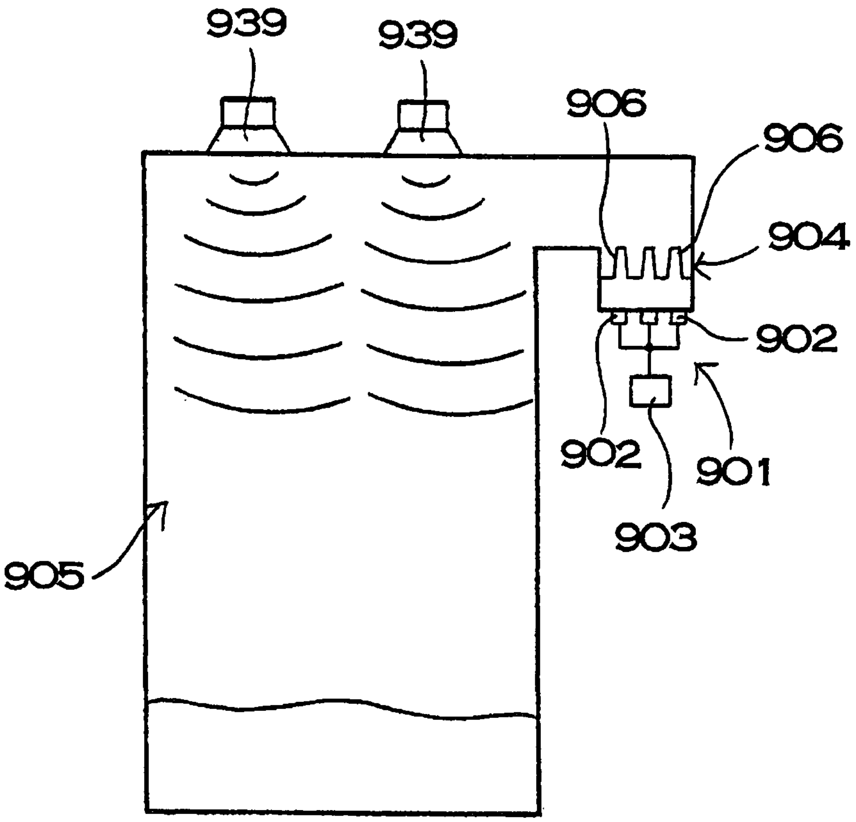
FIG. 9 is a schematic view showing the ultrasonic solution separating apparatus according to yet another embodiment of the invention.

1, 301, 401, 601, 701, 801, 901 ultrasonic atomizer
2, 302, 402, 602, 702, 802, 902 ultrasonic vibrator
3, 303, 403, 803, 903 ultrasonic electric power source
4, 304, 404, 804, 904 ultrasonic atomization chamber
5, 305, 405, 805, 905 collection unit
6, 306, 406, 606, 706, 806, 906 tube
706A branch tube
7 circulation duct
408 duct
9 intake
10, 310, 410 pump
11, 311, 411 starting solution tank
12, 312, 412, 612, 712 spray opening
613, 713 inlet aperture
14, 614, 714 gas nozzle
15, 615, 715 duct
16, 616, 716 connection duct
17 male thread
18 female thread
19, 619, 719 supply duct
20, 620, 720 O-ring
21, 621, 721 O-ring
622, 722 connecting part
623, 723 connecting hole
624, 724 removable connector
625, 725 mounting chamber
626, 726 power supply circuit component
627, 727 lead wire
628, 728 gasket
629, 729 connecting recess
630, 730 O-ring
33 cooling heat-exchanger
34 heat-exchanger pipe
335, 435 circulation pump
336, 436 nozzle
837 baffle
838 fan
939 mist vibrator
P liquid column

The invention claimed is:

1. An ultrasonic solution separating method comprising the steps of:

ultrasonically vibrating a solution by using an ultrasonic vibrator to atomize the solution into mists;

condensing and collecting such atomized mists in a non-heated state; and separating the mists from the solution, wherein the ultrasonically vibrating step is performed in such a manner that the solution is supplied in a tube defining a spray opening at an upper end of the tube and the solution is ultrasonically vibrated to be released from the spray opening of the tube for being dispersed and atomized into the mists by supplying a carrier gas.

2. The ultrasonic solution separating method as recited in claim 1, wherein the tube is cylindrical.

3. The ultrasonic solution separating method as recited in claim 1, wherein the tube is a conical horn that is tapered toward the spray opening.

4. The ultrasonic solution separating method as recited in claim 1, wherein the tube is an exponential horn.

5. The ultrasonic solution separating method as recited in claim 1, wherein a carrier gas is blown around the spray opening.

6. The ultrasonic solution separating method as recited in claim 5, wherein the carrier gas blown around the spray opening is an inactive carrier gas including nitrogen, helium and argon.

7. An ultrasonic solution separating apparatus comprising:

a plurality of ultrasonic vibrators for ultrasonically vibrating a solution to atomize the solution into mists;

an ultrasonic electric power source, connected to the ultrasonic vibrator, for supplying a high-frequency power to the ultrasonic vibrator to produce an ultrasonic vibration;

and a collection unit for condensing and collecting the mists atomized by the ultrasonic vibrator, whereby the mists atomized in a ultrasonic atomization chamber are collected at the collection unit to be separated from the solution, wherein a tube, defining a spray opening opened at the top thereof, is disposed above the ultrasonic vibrator in a non-heated state, so that the solution is supplied into the tube and the solution is ultrasonically vibrated by the ultrasonic vibrator to be released from the spray opening so as to be dispersed in a form of atomized mists, and wherein the tube has a gas nozzle opened for supplying a carrier gas to the atomized mists and has a carrier gas source connected to the gas nozzle, so that the carrier gas blown from the gas nozzle is supplied to the mists to atomize the mists therein and the atomized mists are condensed and collected at the collection unit.

8. The ultrasonic solution separating apparatus as recited in claim 7, wherein the tube is cylindrical.

9. The ultrasonic solution separating apparatus according to claim 7, wherein the tube is a conical horn that is tapered toward the spray opening thereof.

10. The ultrasonic solution separating apparatus as recited in claim 7, wherein the tube is an exponential horn.

11. The ultrasonic solution separating apparatus as recited in claim 7, wherein the gas nozzle is opened around the spray opening.

12. The ultrasonic solution separating apparatus as recited in claim 7, wherein an inactive carrier gas including nitrogen, helium and argon is supplied from the carrier gas source to the gas nozzle.

13. An ultrasonic solution separating apparatus comprising:

a plurality of ultrasonic vibrators for ultrasonically vibrating a solution to atomize the solution into mists;

an ultrasonic electric power source, connected to the ultrasonic vibrator, for supplying a high-frequency power to the ultrasonic vibrator to produce an ultrasonic vibration; and a collection unit for condensing and collecting the mists atomized by the ultrasonic vibrator;

a ultrasonic atomization chamber in which the mists are atomized to be collected at the collection unit thus separated from the solution;

a plurality of tubes defining a spray opening opened at the top thereof and disposed above the plurality of the ultrasonic vibrators respectively, so that the solution is supplied into the tube and the solution is ultrasonically vibrated by the ultrasonic vibrator to be released from the spray opening so as to be dispersed in a form of atomized mists; and a plurality of mist intakes disposed in a vertical orientation above the plurality of the tubes, each of the mist intakes being connected with the ultrasonic atomization chamber and being disposed to separately open its lower end above the spray opening of the tube, respectively.

* * * * *